United States Patent Office 3,526,841
Patented Sept. 1, 1970

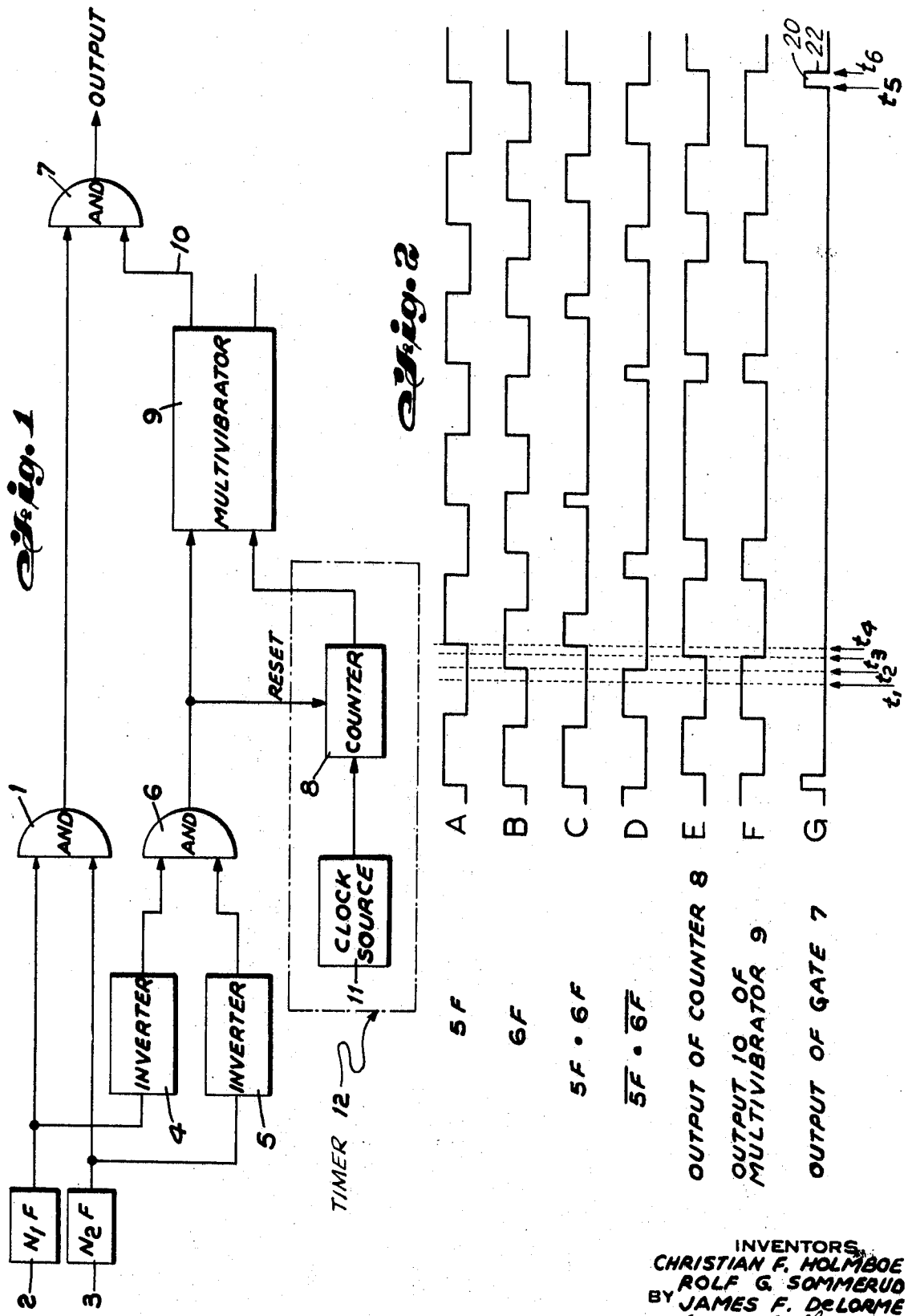

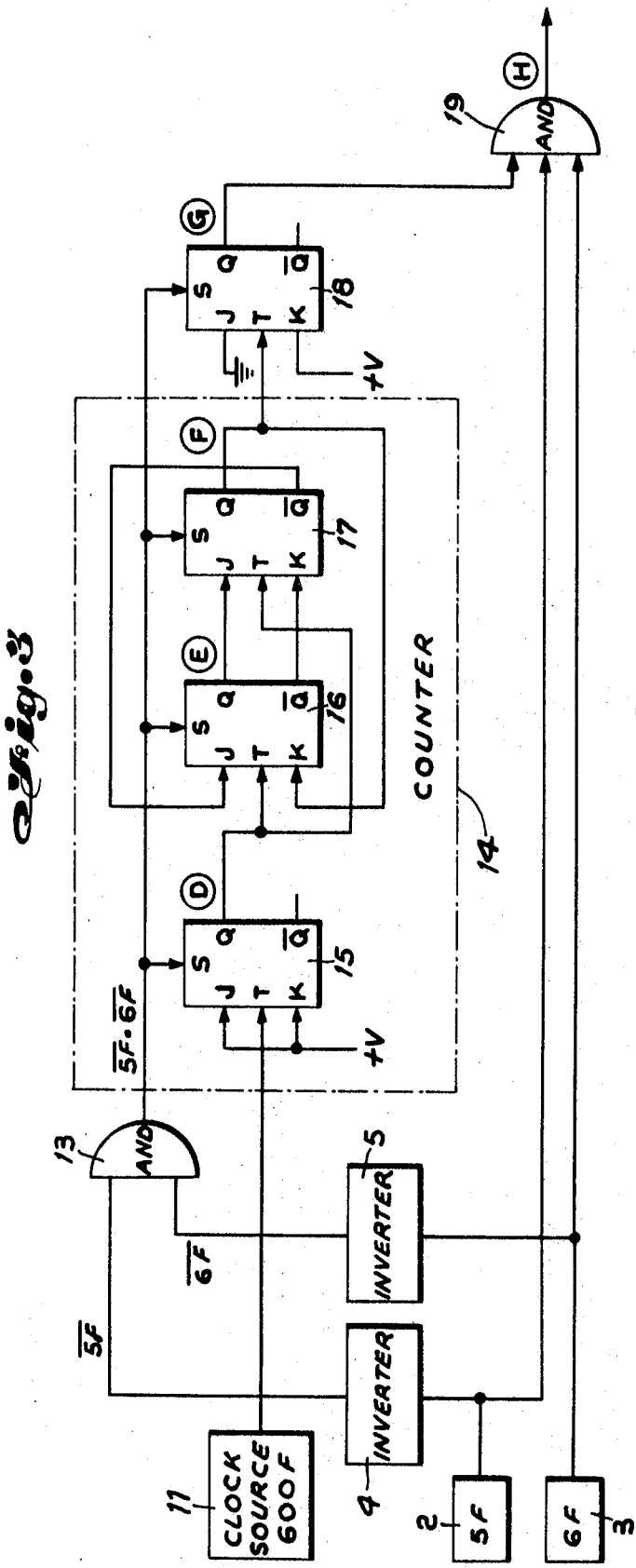

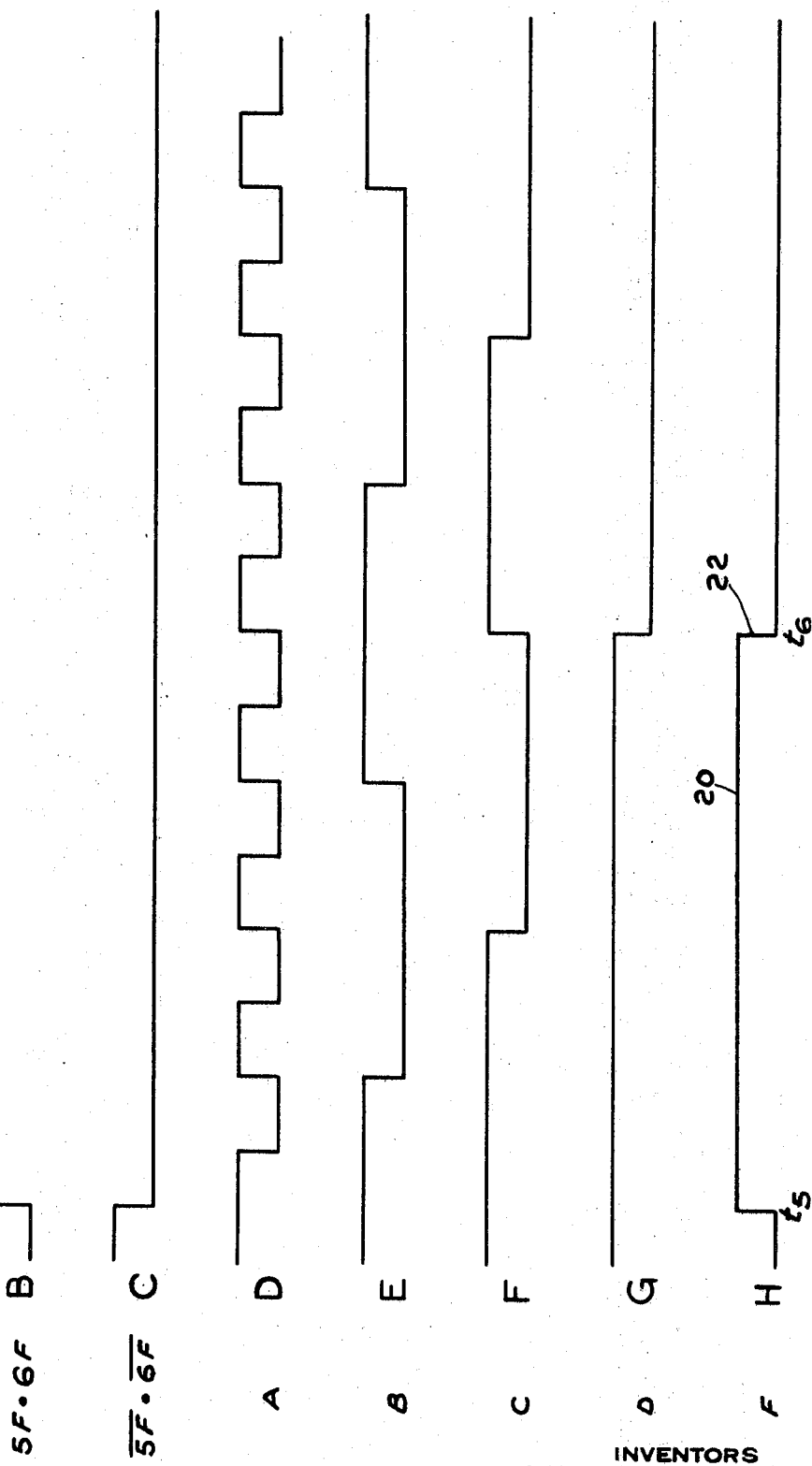

3,526,841
DETECTOR FOR HARMONICALLY RELATED SIGNALS
Christian Fredrik Holmboe, Bekkestua, and Rolf Gunnar Sommerud, Strommen, Norway, and James Francis De Lorme, Irvington, N.J., assignors to International Telephone and Telegraph Corporation, Nutley, N.J., a corporation of Maryland
Filed Oct. 30, 1967, Ser. No. 678,960
Int. Cl. H03b *3/04;* H03d *13/00*
U.S. Cl. 328—133                                    10 Claims

ABSTRACT OF THE DISCLOSURE

Apparatus for detecting the common subharmonic frequency of a plurality of harmonically related input signals wherein the input signals are applied to a first coincidence circuit and the inverted input signals are applied to a second coincidence circuit. An output signal is provided when a change in the state of the second coincidence circuit is followed within a predetermined time period by a change in the state of the first coincidence circuit. The repetition rate of the output signal is equal to the common subharmonic frequency.

BACKGROUND OF THE INVENTION

This invention relates to multipulse detectors and more particularly to apparatus for detecting a common subharmonic frequency from a plurality of harmonically related input signals.

In many communication systems, navigation systems and the like, it is required to derive a common subharmonic frequency from a plurality of harmonically related input signals. In some of these systems, it is further required to derive the common subharmonic frequency from two or more sets of harmonically related frequencies and to determine the phase differences between the common subharmonic frequencies derived from each respective set. Most prior art systems for deriving a common subharmonic frequency utilized analog detection schemes which had the disadvantage of being very susceptible to noise in the system, thereby decreasing the reliability of the detection process. Even in some of the heretofore proposed digital systems, desirable results are not provided when the harmonically related input signals from which the common subharmonic frequency is to be derived are not substantially in phase. Furthermore, some prior art digital detection systems, while providing reliable detection when the signals are somewhat out of phase with respect to each other, do not operate satisfactorily when the input signals are very close in frequency, such as 5F and 6F, where F is the common subharmonic frequency.

SUMMARY OF THE INVENTION

Therefore, the main object of this invention is to provide a detector capable of deriving a common subharmonic frequency from a plurality of harmonically related input signals.

A further object of this invention is to provide a detector capable of deriving the common subharmonic frequency from a plurality of harmonically related signals even when the harmonically related signals are somewhat out of phase with respect to each other.

According to this invention, apparatus for detecting a common subharmonic frequency from a plurality of input signals comprises a source of at least two sets of signals, one set being the inverse of another set and the signals of each set having frequencies which are multiples of a common subharmonic frequency. Further provided is a first combiner coupled to the input source for combining one set of signals and means responsive to transitions in the combiner output signal for providing an intermediate signal after a predetermined delay. Further provided is a second combiner responsive to another set of signals from said source and to the output of the providing means for producing an output signal, the frequency of which is equal to the common subharmonic frequency.

BRIEF DESCRIPTION OF THE DRAWINGS

FIG. 1 is a simplified block diagram of a preferred embodiment of the detector according to this invention;

FIG. 2 is an illustration of the waveforms appearing at designated points in the circuit in FIG. 1;

FIG. 3 is a more detailed block diagram of a detector according to the invention;

FIG. 4 is the "truth table" for the multivibrators utilized in the detector of FIG. 3; and FIG. 5 illustrates pertinent waveforms appearing in the circuit of FIG. 3 on an expended time base.

DESCRIPTION OF THE PREFERRED EMBODIMENT

In FIG. 1 a preferred embodiment of a detector according to this invention is illustrated. The input signals to the system are signals having the frequencies $N_1F$ and $N_2F$ (where $N_1=5$ and $N_2=6$ in this example), which are presumed for the purposes of this description, to be digital in nature. The inverses of the 5F and 6F signals are derived by means of inverting amplifiers (a method well known in the art) and are also utilized in the detector scheme. It is desirable to extract the common subharmonic frequency F from these input signals.

The detector illustrated in FIG. 1 comprises an AND gate 1 to which is coupled signal sources 2 and 3, of frequencies $N_1F$ and $N_2F$, respectively. The outputs of signal sources 2 and 3 are coupled to inverting amplifiers 4 and 5, respectively, to derive the inverses $\overline{N_1F}$ and $\overline{N_2F}$, respectively, of the $N_1F$ and $N_2F$ signals. It should be clear this is only illustrative of a method for providing $N_1F$, $N_2F$, $\overline{N_1F}$ and $\overline{N_2F}$ and that other well known methods may be used. For example, the appropriate signals could be generated in an analog manner and then converted to digital signals such as those shown in FIGS. 2A and 2B. The output of inverters 4 and 5 are applied to AND gate 6. The output of AND gate 1 is applied to one input of AND gate 7 and the output of AND gate 6 is applied to the reset input of a timer 12 and to the set input of a multivibrator 9. The timer 12 in this embodiment includes a counter 8 to which a source of clock signals 11 is coupled. Counter 8 provides an output signal after a predetermined number of clock signals are applied thereto. Note that the repetition rate of the clock signals from clock source 11 is higher than $N_1F$ or $N_2F$. The output of timer 12 is coupled to the "reset" input of multivibrator 9. One output 10 of multivibrator 9 is coupled to the other input of AND gate 7.

Referring to the block diagram of FIG. 1 in conjunction with the waveforms shown in FIG. 2, the operation of a detector according to the invention will be described. FIG. 2A illustrates the input signal of frequency $N_1F$ (which is taken to be 5F in this example) and FIG. 2B illustrates the input signal of frequency $N_2F$ (which is taken as 6F in this example). FIG. 2C illustrates the signal 5F. 6F appearing at the output of AND gate 1 and FIG. 2D illustrates the signal $\overline{5F} \cdot \overline{6F}$ appearing at the output of AND gate 6.

FIG. 2E illustrates the output of timer 8, FIG. 2F illustrates the output of the multivibrator 9 and FIG. 2G illustrates the output of AND gate 7.

Before the system is discussed in detail, some basic operational properties of the constituents of FIG. 1 are hereinbelow discussed. When the output of AND gate 6 is in its binary "1" state, the timer 12 is held in its reset condition and the multivibrator 9 is "set" so that a binary "1" appears at the output 10 thereof. When the output of AND gate 1 is at binary "1" coincident with the output 10 of multivibrator 9 being at "1", a "1" output will be produced from AND gate 7. When the output of AND gate 6 makes the transition from "1" to "0", the reset signal is removed from the timer 12 and the "set" signal is removed from multivibrator 9. Note that the mere removal of the "set" signal from the input of multivibrator 9 does not cause the state of the output 10 to change. The timer 12 operates such that after a predetermined time period (corresponding to the counting of a predetermined number of clock pulses) a "1" will appear at the output thereof which resets multivibrator 9 so that a "0" appears on the output 10.

It is pointed out that the timer 12 may be replaced by many other appropriate types of timing or delay means which are well known in the art. In the embodiment of FIG. 1, a simple exemplification of such a timer 12 could merely be a counting chain of symmetrically triggered multivibrators coupled to the clock source 11, the length of the chain being proportional to the predetermined counting period. Means should also be provided for inhibiting the clock source 11 from further triggering the chain after the last multivibrator in the chain has been triggered (i.e. after an output pulse is provided) and until another reset signal is received. This type of counter is well known in the art and is capable of being designed within the spirit of this invention by one ordinarily skilled in the art. Therefore a more detailed description of this type of counter is not included herein. In FIG. 3 there is shown a more complex design of a timer suitable for use with the invention.

Referring to FIG. 2, at time $t_1$ it is seen that the output of AND gate 1 is "0" (FIG. 2C) and the output of AND gate 6 is "1" (FIG. 2D). Therefore, as shown in FIG. 2G, a "0" output is provided at the output of AND gate 7. At time $t_2$ the output of AND gate 6 makes the transition from "1" to "0", thereby releasing the reset signal to the counter 8 and causing counter 8 to start counting at a rate corresponding to the frequency of the clock source 11. During the period of time $t_2$ to $t_3$, while the counter 8 is counting, the output of multivibrator 9 continues to be a "1". At time $t_3$ when the counter 8 has completed its counting cycle, a "1" is applied to the "reset" input of multivibrator 9 and causes the output 10 thereof to go to the "0" state (see FIG. 2F). $t_2-t_3$ is equal to the counting period of counter 8. At $t_4$, the output of AND gate 1 (FIG. 2C) makes the transition from "0" to "1" but this will not affect the state of AND gate 7 since prior to this transition (i.e. at time $t_3$) the other input to AND gate 7 from multivibrator 9 became "0". Therefore, it is seen that as long as the counting period of counter 8 is less than the time period between negative transitions of the output of AND gate 6 and positive transitions of the output of AND gate 1, no output will be provided at the output of AND gate 7.

To illustrate the detection of the frequency F, at time $t_5$, the output of AND gate 6 goes to "0" (FIG. 2D) and the counter 8 begins to count for its predetermined period. Note that during this counting period, the output 10 of multivibrator 9 is "1". Also, at approximately $t_5$ the output of AND gate 1 makes the transition from "0" to "1" (FIG. 2C), thereby causing a "1" to appear on both inputs to AND gate 7. This causes the pulse 20 of FIG. 2G to be generated at the output of AND gate 7, the time duration thereof (in this example) being substantially equal to the counting period of counter 8. At time $t_6$, which corresponds to the end of the counting period which began at time $t_5$, the output of the counter 8 goes to "1" and resets multivibrator 9, thereby causing a "0" to appear at output 10 of multivibrator 9 and forming the trailing edge 22 of pulse 20 of FIG. 2G.

It is pointed out that only once every $1/F$ seconds does the condition exist whereby a "1" will simultaneously appear on both inputs to AND gate 7. This is due to the fact that the counting period of counter 8 and the frequency of clock source 11 are chosen such that the counting time of counter 8 is less than the time $(t_4-t_2)$ which is the shortest interval between negative excursions of the $\overline{5F} \cdot \overline{6F}$ signal and positive excursions of the $5F \cdot 6F$ signal (except for the time where these excursions occur substantially simultaneously in time, such as at $t_0$ and at $t_5$). The interval $(t_4-t_2)$ is equal to $$\frac{1}{5F} - \frac{1}{6F}$$

This phenomenon of the excursions of the two signals occurring substantially simultaneously occurs once every $1/F$ seconds, this repetition rate corresponding to the common subharmonic frequency F.

FIG. 3 illustrates another embodiment of the instant invention which shows in more detail the constituents and operation of a typical detector. Elements common to the detector of FIGS. 1 and 3 are given the same reference designations. In this embodiment, the 5F and 6F signal sources 2 and 3, respectively are coupled directly to two respective inputs of AND gate 19. The 5F and 6F signals are also applied to respective inverting amplifiers 4 and 5, the outputs of which are coupled to respective inputs of AND gate 13. The output of AND gate 13 is coupled to counter 14 which comprises multivibrators 15, 16 and 17, and to the "S" input of multivibrator 18. Multivibrators 15–18 are of the "J-K" type and the truth table therefor is shown in FIG. 4. The output of AND gate 13 is applied to the "S" inputs of multivibrators 15, 16, 17 and a source of clock signal 11 is coupled to the "T" input of multivibrator 15. The "Q" output of multivibrator 15 is coupled to the "T" inputs of multivibrators 16 and 17. The "J" input of multivibrator 16 is coupled to the "$\overline{Q}$" output of multivibrator 17 and the "K" input of multivibrator 16 is coupled to the "Q" output of multivibrator 17 and to the "T" input of multivibrator 18. The "Q" and "$\overline{Q}$" outputs of multivibrator 16 are coupled to the "J" and "K" inputs of multivibrator 17, respectively. The "Q" output of multivibrator 18 is coupled to a third input of AND gate 19. The "J" and "K" inputs of multivibrator 15 and the "K" input of mutlivibrator 18 are coupled to voltage source $+V$ (which is a logical "1") and the "J" input of multivibrator 18 is coupled to ground potential (logical "0").

The system of FIG. 3 operates in substantially the same manner as that of FIG. 1 and will therefore not be discussed in great detail. The waveforms at various designated points in the circuit of FIG. 3 are illustrated in FIG. 5 on the expanded time scale relative to those of FIG. 2 for ease of understanding. The waveforms of FIG. 5 illustrate the sequence of events between the time $t_5$ and $t_6$ during which the pulse 20 (see FIG. 2) is generated.

In this embodiment the frequency of the clock source is 600F. It is pointed out that any other appropriate frequency may be used, but depending upon the frequency F and the frequencies of the input signal from which the common harmonic F is to be derived, some modifications to the counter 14 may be necessary in order to provide the proper delay periods. These modifications may be easily designed and implemented by one ordinarily skilled in the art within the spirit of this invention.

Referring to FIGS. 3 and 5, when the output of AND gate 13 goes from its "1" state to its "0" state at $t_5$ (see FIG. 5C), the reset signal is released from the S inputs of multivibrators 15–18. At this point, the counter 14 is now able to begin counting the clock pulses from clock source 11 (which are at a frequency 600F). This counting of clock pulses continues as shown in FIG. 5, until the output of multivibrator 18 makes the transition from "1" to "0" at the time $t_6$. At this time the output of AND gate 19 (see FIG. 5H) also goes from "1" to "0" since one of the inputs thereto is no longer "1." It is seen for this example that means to inhibit the counter 14 from counting after the time $t_6$ is unnecessary since after multivibrator 18 goes from "1" to "0", the output state thereof can no longer change until it is reset by a "1" signal appearing at its "S" input. This is clearly seen from the truth table of FIG. 4. Therefore, during the time period until the output of AND gate 13 goes to "1" again, the output multivibrator 18 will be zero regardless of how many times counter 14 recycles.

The detector shown in FIG. 3 will operate properly with signals that are somewhat out of phase with respect to each other. For example the ideal detector based on this principle will properly detect the common subharmonic frequency F if the phase of the $N_1F$ signal is as much as $\pm 2t_1N_1F$ radians of N.F out of phase with respect to the $N_2F$ signal, where $$t_1 = 1/2 \left( \frac{1}{N_2F} - \frac{1}{N_1F} \right)$$

The instant invention is particularly useful in radio navigation systems such as the NARLOF System for performing lane identification. In this system, signals of frequency 8F and 9F are transmitted from a slave station and signals of frequency 5F and 6F from a master station. Two detectors according to this invention in the receiver detect the respective fundamental frequencies F from the two pairs of signals. The phase difference between the two detected fundamental frequencies is then measured. This phase difference represents a course measurement of the lane. The detector for 5F and 6F is shown in FIG. 3. The detector for the 8F and 9F frequencies may be designed according to the principles disclosed herein by one ordinarily skilled in the art within the spirit of this invention.

While we have described above the principles of our invention in connection with specific apparatus it is to be clearly understood that this description is made only by way of example and not as a limitation to the scope of our invention as set forth in the accompanying claims:

1. Apparatus for detecting a common subharmonic frequency of a plurality of input signals comprising:
   a source of at least two sets of signals, one set being the inverse of another set, the signals of each said set having frequencies which are multiples of a common subharmonic frequency;
   first means coupled to said source for combining one set of signals to produce a combined signal;
   means coupled to said combining means and responsive to predetermined transitions in said combined signal for providing an intermediate signal after a predetermined delay; and
   second combining means coupled to said source and to said providing means, and responsive to the signals of another of said sets and to said intermediate signal for producing an output signal having said common subharmonic frequency.

2. Apparatus according to claim 1 wherein said providing means include timing means coupled to said first combining means for causing said intermediate signal to be generated after said predetermined delay.

3. Apparatus according to claim 2 wherein said providing means further includes a bi-stable device, one input thereof being coupled to the output of said first combining means, another input thereof being coupled to the output of said timing means and an output thereof being coupled to an input of said second combining means.

4. Apparatus according to claim 3 wherein said bi-stable device includes a bi-stable multivibrator.

5. Apparatus according to claim 2 wherein said timing means includes:
   a counter having reset, input and output terminals;
   means coupling the output of said first combining means to said reset terminal;
   a clock source coupled to the input terminal of said counter; and
   means coupling the output terminal of said counter to said another input of said bi-stable device.

6. Apparatus according to claim 1 further comprising a third combining means coupling said source to said second combining means, said third combining means responsive to the signals of said another set.

7. Apparatus according to claim 6 wherein each said combining means includes an AND-gate.

8. Apparatus according to claim 1 wherein said source provides two sets of two signals, the signals of one set being the inverse of the other set and wherein the magnitude of said predetermined delay is less than the difference between the periods of the two signals which comprise each said set.

9. A detector according to claim 2 wherein said timing means includes;
   a clock signal source;
   first, second and third multivibrators, each said multivibrator having first through fourth inputs and first and second outputs;
   means coupling the ouput of said first combining means to the first input of each of said multivibrators;
   a source of unidirectional voltage;
   means coupling said voltage source to the second and fourth inputs of said first multivibrator;
   means coupling said clock source to the third input of said first multivibrator;
   means coupling the first output from said first multivibrator to the third inputs of said second and third multivibrators;
   means coupling the first output of said second multivibrator to the second input of said third multivibrator;
   means coupling the second output of said second multivibrator to the fourth input of said third multivibrator;
   means coupling the first output of said third multivibrator to the fourth input of said second multivibrator;
   means coupling the second output of said third multivibrator to the second input of said second multivibrator and
   means coupling the first output of said third multivibrator to the output terminal of said timing means.

10. A detector according to claim 9 wherein said providing means further includes a fourth multivibrator having first through fourth inputs and first and second outputs, the first input thereof being coupled to the output of said first combining means, the second input thereof being coupled to ground potential, the third input thereof being coupled to the output terminal of said timing means, the fourth input thereof being coupled to said source of unidirectional voltage and the first output thereof being coupled to said second combining means.

References Cited

UNITED STATES PATENTS 3,441,745  4/1969  Reeves e al. _____ 328—133 XR

DONALD D. FORRER, Primary Examiner

J. ZAZWORSKY, Assistant Examiner

U.S. Cl. X.R.

307—233; 328—16, 157